United States Patent [19]

Brubaker et al.

[11] E Patent Number: Re. 32,810

[45] Reissued Date of Patent: Dec. 27, 1988

[54] ELECTRICAL CONTACT FOR TERMINATING INSULATED CONDUCTORS

[75] Inventors: Weldon L. Brubaker, Lisle; Arnold A. Case, St. Charles, both of Ill.

[73] Assignee: Molex Incorporated, Lisle, Ill.

[21] Appl. No.: 53,657

[22] Filed: May 26, 1987

Related U.S. Patent Documents

Reissue of:

[64] Patent No.: 4,538,872
Issued: Sep. 3, 1985
Appl. No.: 549,109
Filed: Nov. 7, 1983

[30] Foreign Application Priority Data

Nov. 22, 1982 [GB] United Kingdom ..... 8233243

[51] Int. Cl.[4] ..... H01R 4/24
[52] U.S. Cl. ..... 439/397
[58] Field of Search ..... 439/389, 391, 395, 396, 439/397, 399, 400, 401, 406, 407, 417, 418

[56] References Cited

U.S. PATENT DOCUMENTS 3,878,318 4/1975 Ziegler, Jr. et al. ..... 339/97 R
4,243,286 1/1981 Brown et al. ..... 339/97 R

*Primary Examiner*—Joseph H. McGlynn
*Attorney, Agent, or Firm*—John W. Cornell; Louis A. Hecht

[57] ABSTRACT

A contact member for forming an electrical connection with insulated conductors of either a solid core, stranded or tinsel ribbon type is formed from a unitary piece of stamped sheet metal and includes both an insulation displacement portion and an insulation piercing portion. The insulation displacement portion comprises a slotted plate for establishing contact with the conductor by severing and displacing its insulation. The insulation piercing portion includes an arm spaced laterally from the plate and adapted with a barb for piercing through the conductor insulation. The insulation displacement and insulation piercing portion of the contact member cooperate or function alternatively to provide an effective electrical connection with the conductor, regardless of its particular type.

4 Claims, 2 Drawing Sheets

ELECTRICAL CONTACT FOR TERMINATING INSULATED CONDUCTORS

Matter enclosed in heavy brackets [ ] appears in the original patent but forms no part of this reissue specification; matter printed in italics indicates the additions made by reissue.

FIELD OF THE INVENTION

This invention relates generally to electrical contact members for terminating insulated conductors, and specifically, to a contact member having the capability of terminating a conductor without prior removal of the conductor's insulative coating.

BRIEF DESCRIPTION OF THE PRIOR ART

A wide variety of methods and devices are available for terminating an insulated electrical conductor such that the conductor may provide a reliable electrical connection between circuitry apparatus of diverse type. Because of its inherent economies, a preferred method involves terminating a conductor to a contact member without prior stripping or removal of the insulative coating covering the conductor. Such a method is particularly well suited for use in the telecommunications or data processing industries, wherein electronic equipment is often field-installed or serviced. By eliminating the step of stripping the insulation from the conductor, significant economics are possible in the wiring of electronic or electrical apparatus.

Two such methods have become widely accepted, namely, insulation piercing and insulation displacement. In the former case, an electrical connection is established with the conductor typically through the use of a barbed contact member which has been forced through the insulative coating of the conductor. An exemplary contact member of this type is disclosed in Hardesty, U.S. Pat. No. 4,054,350 issued Oct. 18, 1977, illustrating the termination of a multi-conductor cord through the use of barbed, blade-like terminals. In the case of the latter method, the insulative coating of the conductor is severed by the edges of a slot formed in a contact member permitting the insulative coating to be displaced in the region of the connection. This method is disclosed, for example, in Carre, U.S. Pat. No. 4,217,022.

In practice, the selection of termination methods as between insulation piercing and insulation displacement, depends primarily upon the construction of the conductor which is to be terminated. Insulated conductors in wide-spread use may fall in three general categories, namely, solid core, stranded or tinsel wire.

Solid core conductors, which typically comprise a unitary core of conductive material covered with a dielectric coating, are best suited for insulation displacement techniques because of the relative rigidity of the central core. Conversely, piercing methods are generally unreliable for use with a solid core conductor.

Stranded wire usually has a core consisting of a plurality of relatively thin conductive members grouped together. This type of wire may be terminated by either insulation piercing or insulation displacement, if suitable precautions are taken in the design of the contact member to assure a reliable electrical connection to the terminated wire.

Tinsel conductors typically comprise a plurality of tinsel ribbons wrapped helically about a filamentary core with the resulting assembly enclosed in a textile braid or nylon jacket. This type of conductor is known to be unsuitable for termination by insulation displacement, inasmuch as the filamentary core is too soft to provide for appropriate contact forces between the contact member and the tinsel ribbon.

Because all of these conductor types are in wide-spread use, particularly in the telecommunications field, it would be desirable to provide a single contact member which has the capability of terminating any one of these conductors as needed.

SUMMARY OF THE INVENTION

It is therefore, the principal object of the present invention to provide a contact member having the capability of establishing a reliable electrical connection with either a solid, a stranded, or a tinsel wire.

It is another object of the present invention to incorporate in such a contact member the advantages offered by insulation piercing and insulation displacement methods.

Yet another object is to provide such a contact member in the form of a unitary structure.

A still further object is to provide a housing for the contact member which permits for ease of conductor termination in field installation situations without the requirement of specially made implements.

The foregoing and other objects and advantages are accomplished by the present invention, wherein a contact member for forming an electrical connection with an insulated conductor is provided. The contact member includes a plate having a slot defining a pair opposed edges for severing and displacing the insulation of the conductor inserted therebetween. A mouth formed at an edge of the plate opens to the slot and leads to a relatively narrow section for receiving and terminating the conductor to the contact member. In addition, insulation piercing means are connected to and spaced laterally from the plate, in alignment with the slot, for piercing the insulation of a conductor upon its termination to the contact member.

BRIEF DESCRIPTION OF THE DRAWINGS

The aforementioned objects and features of the invention, as well as other objects and features, will be better understood upon consideration of the following detailed description and appended claims taken in conjunction with the attached drawings of an illustrative embodiment thereof in which:

DESCRIPTION OF THE PREFERRED EMBODIMENT

Figure 1:
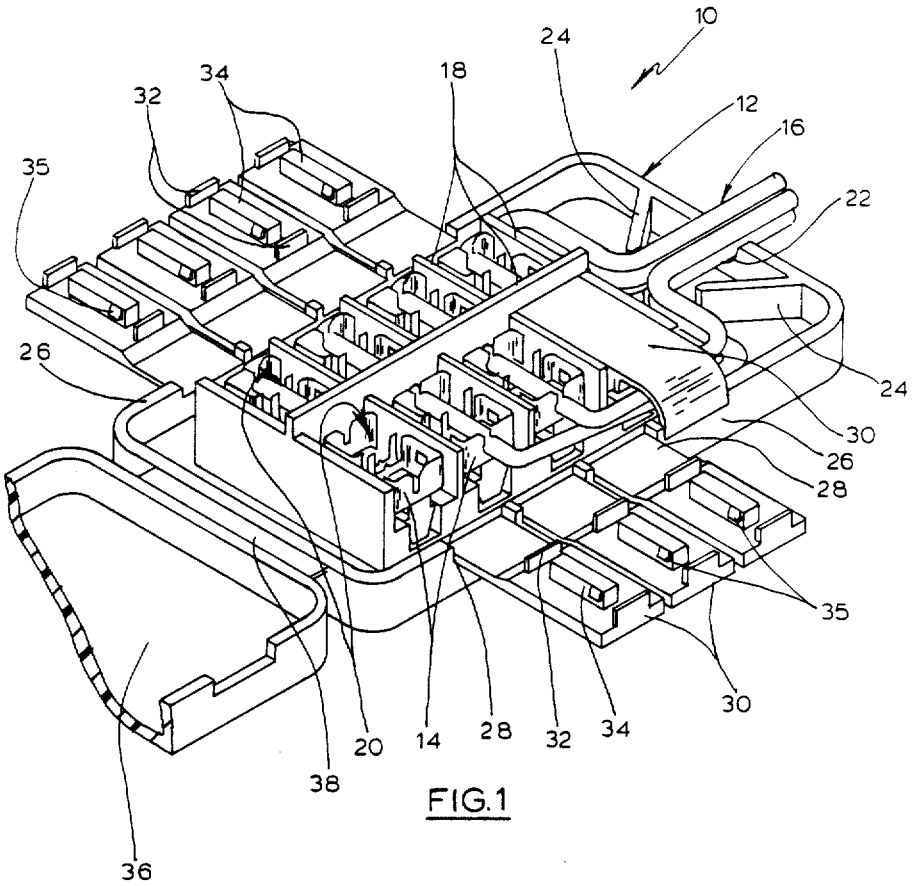
FIG. 1 is a perspective view of a connector assembly in accordance with the present invention.

Referring now to the drawings, in FIG. 1, there is shown an electrical connector assembly in accordance with the present invention, designated generally by the reference numeral 10. The connector assembly 10 is of a type suitable for use in telecommunications applications and comprises a dielectric housing 12 fitted with a plurality of contact members 14 for forming electrical connections with respective insulated conductors 16.

The housing 12 includes a plurality of internal partitions 18 which define recesses 20 for receiving and electrically isolating the contact members 14. An opening 22 in the housing 12 allows for exit of the terminated conductors 16, and suitable strain relief formations 24 are provided internally of the housing 12 to aid in the prevention of dissociation of the conductors 16 from the contact members 14.

Extending from sidewalls 26 of the housing 12 by means of a plastic living hinge arrangement 28 are a plurality of termination tabs 30 corresponding in number to the number of contact members 14 housed within the assembly 10. The termination tabs 30 carry ram blocks 32 and 34 which are receivable within the recesses 20, for purposes which will be described in greater detail hereinafter. Ramp-like latching projections 35 extend from the sides of the blocks 34.

In order to seal the housing 12, the connector assembly 10 includes a suitable cover 36 connected to the housing 12 by means of an integrally formed hinge 38. By a number of well-known latching arrangements, the cover 36 may be adapted to snap fit over the housing after tabs 30 and blocks 32 and 34 are received within their respective recesses 20.

Figure 2:
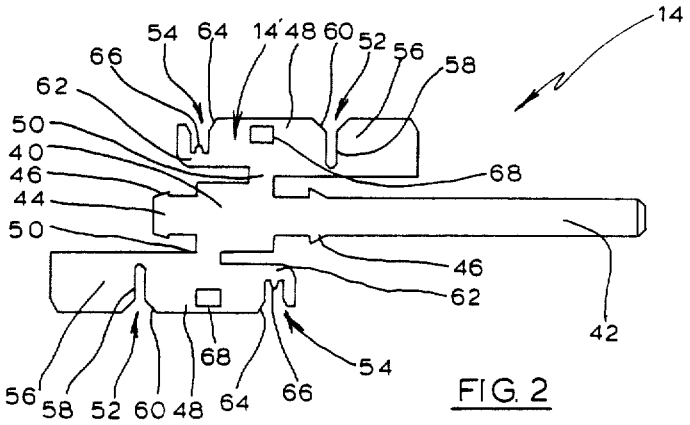
FIG. 2 is a plan view of a blank from which the contact members shown in FIG. 1 may be formed.

Turning now to FIG. 2, the contact member 14 illustrated in FIG. 1 is shown as it would appear in the form of a stamped, sheet metal blank, designated generally by the reference numeral 14'. The blank 14' is preferably a unitary piece of relatively thin, highly conductive material. The contact member 14 includes a central body 40 portion from which an elongated, blade-like terminal portion 42 extends providing an electrical contact member for connection to other circuitry apparatus (not shown). Extending from the opposite side of the body 40 is a retention tab 44. Both the terminal portion 42 and tab 44 have a pair of ears 46 extending laterally therefrom for retaining the contact member 14 between the partitions 18 formed in the housing 12. The body 40 portion also carries a pair of wings 48 connected to the body portion 40 by support members 50. Each wing 48 is the mirror image of the other and is seen to include an insulation displacement portion and insulation piercing portion, designated generally by the reference numerals 52 and 54, respectively.

The insulation displacement portion 52 is adapted to form an electrical connection with an insulated conductor by severing and displacing the insulative coating of the conductor core. To this end, a plate 56 is provided and includes a slot 58 having a mouth 60 opening to an edge of the plate 56.

The insulation piercing portion 54 is intended to establish an electrical connection with an insulated conductor by the method of piercing the insulative coating, and therefrom, is formed with an arm 62 having an opening 64 for guiding the insulated conductor. The opening 64 is generally U-shaped and at its bight portion is adapted with an upwardly pointing barb 66. The support members 50 are adapted with latching apertures 68, the operation of which will be described in greater detail hereinafter.

Figure 3:
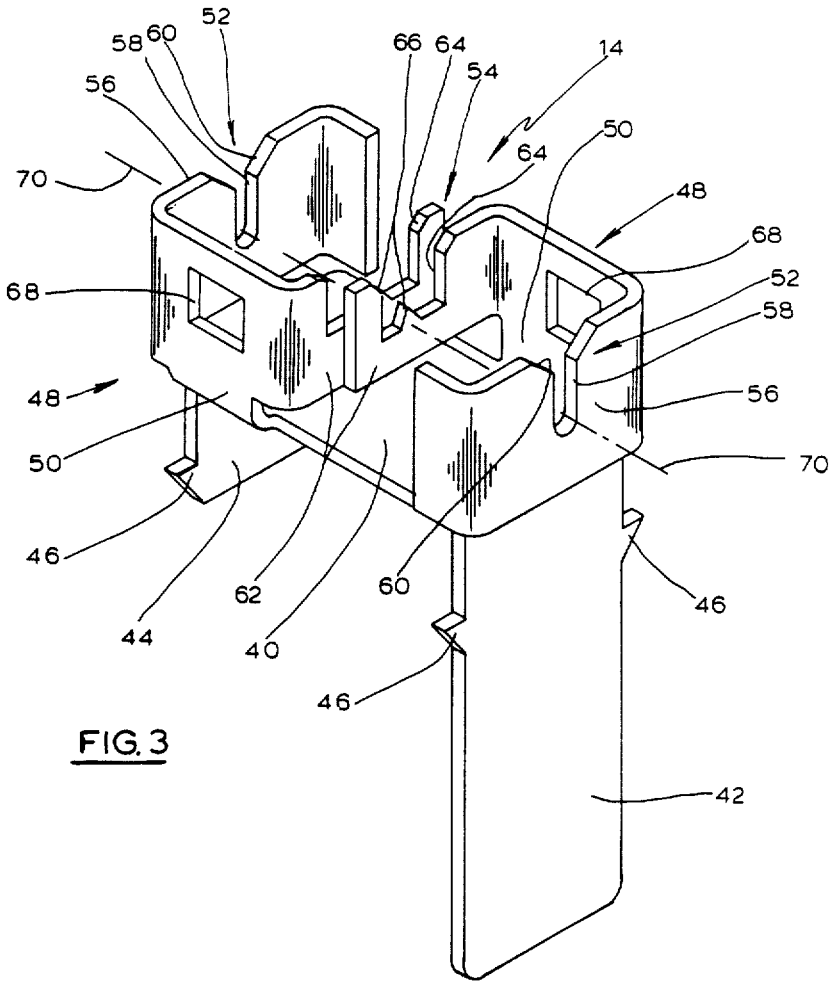
FIG. 3 is an enlarged perspective view of the contact member in its fully formed state.

In FIG. 3, the contact member 44 is shown as it would appear in a fully formed state. As seen, therein, the wings 48 are bent upwardly on their support members 50 and each plate 56 is bent through an angle of ninety degrees such that plates 56 are substantially parallel one to another. Similarly, each arm 62 of the insulation piercing portions 54 is bent at right angles so as to reside in a plane which is substantially parallel to the planes of the plates 56. Because of this resulting U-shape forming of the wings 48, the insulation piercing barbs 66 and insulation displacement slots 58 are all aligned along a common axis of termination designated generally by the reference numeral 70.

Referring to FIGS. 1 and 3, it will be apparent that manual termination of a conductor to the assembly 10 can be readily accomplished by positioning the conductor 16 over the contact member 14 in alignment with the mouths 60 of the insulation displacement slots 58, and correspondingly, in alignment with the U-shape openings 64 of the insulation piercing arms 62. Then, by pivotal movement of the associated tab 30 about its hinge 28, the ram blocks 32 and 34 may be brought in contact with the conductor 16 and further pressed within the contact member 14. The conductor is, thereby, forced into the slots 58 which sever and displace the insulative coating of the conductor 16. Contemporaneously, the insulative coating is pierced by the barbs 66 of the insulation piercing portion 54 of the contact member 14 and the conductor 16 assumes a terminated position along the axis 70. The latching projections 35 thereupon engage the upper edges of the apertures 68 of respective contact members 14, thereby retaining the conductors 16 in seated position against the advent of vibration.

It can be appreciated from the foregoing description that when a tinsel conductor, for example, is terminated to the contact member 14, the barbs 66 provide for effective termination of the tinsel conductor by piercing its insulative coating and establishing contact with the tinsel ribbon. Correspondingly, when it is desired to terminate either a stranded or solid core conductor, the insulation displacement slots 58 provide for the effective termination of those conductor types as well. As best seen in FIG. 3, the insulation piercing portion of the contact member 14 is spaced above the body portion 40 by appropriate dimensioning of the support member 50. Because the arms 62 are, thereby, cantilevered over the body 40, a solid core conductor will cause the arms 62 to deflect downwardly due to natural resilience of the arm material and the inability of the barbs 66 to penetrate the core of the conductor. Therefore, the barbs 66 will not interfere with the action of the insulation displacement slots 58 in providing effective electrical contact between the solid conductor core and the contact member 14.

We claim:

1. An integral stamped electrical contact member for establishing an electrical connection between a conductor of an insulated wire and an external circuit, the contact member including first and second spaced-apart electrical connection means, each having a wall portion with opposed insulation displacing edges forming a conductor-receiving, insulation-displacing slot, the improvement wherein said contact member comprises:

deflectable insulation piercing means colinearly aligned with said slots and disposed therebetween whereby said piercing means engages a piercable conductor and is deflected by an inpiercable conductor.

2. The contact member of claim 1 wherein each connection means includes a vertically deflectable arm extending parallel to said wall portion, the arm of each connection means having said insulation piercing means formed thereon.

3. The contact member of claim 2 wherein each connection means includes a connecting portion joining the arm to its respective wall portion, whereby said two connection means define two oppositely facing U-shaped members.

4. The contact member of claim 2 wherein said insulation piercing means includes a wire receiving notch in each arm having an upstanding insulation piercing barb formed therein.

* * * * *